United States Patent [19]

Hellier et al.

[11] E Re. 31,388

[45] Reissued Sep. 20, 1983

[54] AIR-BAKEABLE WATER-PROOF GETTER DEVICE AND METHOD OF MANUFACTURING

[75] Inventors: Stephen J. Hellier; Anselmo G. Passoni, both of Milan, Italy

[73] Assignee: SAES Getters, S.p.A., Milan, Italy

[21] Appl. No.: 190,392

[22] Filed: Sep. 24, 1980

Related U.S. Patent Documents

Reissue of:

[64] Patent No.: 4,127,361
Issued: Nov. 28, 1978
Appl. No.: 745,982
Filed: Nov. 29, 1976

[30] Foreign Application Priority Data

Dec. 12, 1975 [IT] Italy ..... 30240 A/75

[51] Int. Cl.[3] ..... F04B 37/04; H01J 7/18; H01K 1/56

[52] U.S. Cl. ..... 417/48; 252/181.4; 427/248.1; 427/387; 428/447; 313/561

[58] Field of Search ..... 252/181.4; 427/248.1, 427/387; 428/447; 417/48

[56] References Cited

U.S. PATENT DOCUMENTS

| | | | |
|---|---|---|---|
| 2,156,414 | 5/1939 | Wamsley | 252/181.4 X |
| 2,494,920 | 1/1950 | Warrick | 427/387 |
| 2,833,022 | 5/1958 | Collings | 427/387 X |
| 3,121,182 | 2/1964 | Hui et al. | 313/178 |
| 3,669,567 | 6/1972 | Porta et al. | 417/48 |
| 3,973,816 | 8/1976 | Van Bakel et al. | 316/25 |
| 4,048,145 | 9/1977 | Moss | 260/57 R |

FOREIGN PATENT DOCUMENTS

| | | | |
|---|---|---|---|
| 2345712 | 4/1974 | Fed. Rep. of Germany . | |
| 2028442 | 1/1970 | France . | |
| 762640 | 5/1967 | Italy | 252/181.3 |
| 6906938 | 11/1970 | Netherlands . | |
| 1226728 | 3/1971 | United Kingdom | 252/181.4 |
| 1372823 | 11/1974 | United Kingdom . | |

OTHER PUBLICATIONS

Basic Problems in Thin Films, ed. R. Niedermayer and H. Mayer, Vandernhoek and Ruprecht, 1966, pp. 614–618.

British Journal of Applied Physics, 1965, vol. 16, pp. 45–56.

P. J. Holmes, *Electrochemistry of Semiconductors,* Academic Press, 1962, pp. 119–120.

*Surface Science,* vol. 2, 1964, pp. 277–287.

*Primary Examiner*—Richard D. Lovering
*Attorney, Agent, or Firm*—Quaintance & Murphy

[57] ABSTRACT

A getter device with an organosilane coating.

19 Claims, 6 Drawing Figures

(I)

(II)

(III)

AIR-BAKEABLE WATER-PROOF GETTER DEVICE AND METHOD OF MANUFACTURING

Matter enclosed in heavy brackets [ ] appears in the original patent but forms no part of this reissue specification; matter printed in italics indicates the additions made by reissue.

Exothermic getter devices which release an evaporable getter metal such as barium in a vacuum vessel are well known. Such getter devices usually comprise a pulverulent barium-aluminum alloy of approximate composition $BaAl_4$ in admixture with from about 20 to 80% and preferably about 40 to 60% and more preferably about 50% by weight of an additional metal capable of reacting exothermically with the barium-aluminum alloy. This corresponds to weight ratios of 4:1 to 1:4. Such co-reactant may be Ni, Ti, Fe, Mo or alloys such as intermetallic compounds of nickel with titanium etc. However, nickel is the most preferred additional metal due to its availability at low cost, its ease of handling, its relative stability in ambient conditions and its ability to react exothermically with barium-aluminum alloys with the required degree of exothermicity to control the rate of barium evaporation and hence the getter device flashing characteristics. The use of intermetallic compounds to promote the exothermic reaction is relatively expensive as it involves an additional production stage in the manufacture of the exothermic getter device.

During the manufacture of electric discharge tubes such as color display tubes the getter device is subjected to a wide variety of manufacturing the environmental conditions. Exposure of the getter device to excessive atmospheric humidity or to water during the washing of the electrode system of which the getter device forms a part can cause deterioration of the materials comprising the getter device. The water or water vapor may react with the barium-aluminum alloy to produce barium hydroxide which may in its turn react with other constituents of the atmosphere such as $CO_2$ to produce further chemical compounds. These compounds decompose during evaporation of the getter metal in the finished sealed electron tube with the release of noxious gases which may influence in an undesirable way the composition of the residual gas atmosphere within the tube resulting in poor quality tubes having only a short working life.

Frequently it is desirable to have the getter device already mounted within the glass envelope of a color display tube during the process whereby the phosphor bearing face-plate or screen is hermetically sealed onto the glass cone. This process generally takes place in air, rather than vacuum, at a temperature of about 400° C. or more. This high temperature air exposure can again cause deterioration presumably by oxidation of one or more of the materials comprising the getter device to such an extent that the exothermicity of the barium release reaction becomes so high that this reaction is almost explosive in nature releasing barium in the form of molten particles rather than as a vapor as well as particles of getter alloy mixture. Such uncontrolled release of barium and other particles is detrimental as the particles can later fall onto the electrode structure in the electron tube causing electrical faults. In a color display tube the particles can also block the small apertures in the shadow mask causing areas of the phosphors to be prevented from being excited by the electron beam with a consequent reduction in quality of the displayed image.

The use of organic materials such as nitrocellulose, methyl acrylate resins and polyimide resins dissolved in an organic solvent have been proposed in United Kingdom Pat. No. 1,372,823 as impregnating agents to form a mechanical protective coating on the getter devices. Polyurethane coatings have also been suggested. However, it is well known that thin mechanical coatings are very prone to the formation of pinholes and therefore afford less protection than is desirable. Thicker pin-hole free coatings both undesirably increase the weight of the getter device and make it difficult to completely eliminate the solvent. During evaporation of the getter metal charred remains of the decomposed organic material layer are caused to detach from the getter device surface causing the same inconveniences as with the evaporation of molten barium particles.

Most organic materials decompose at the temperatures required to seal the face plate of a color display tube to the cone thus providing very little protection during this process. In this case it is usually necessary to replace the nickel of the getter alloy mixture with other materials such as the titanium-nickel intermetallic compounds to give a less exothermic reaction and avoid explosive evaporation of barium.

Furthermore, large amounts of impregnating material signify large quantities of decomposition product gases which can be harmful to cathode activity and tube life.

It is also desirable to have a single type of getter device which can be subjected to either a water washing operation or a high temperature air treatment or both without alteration of its evaporation characteristics so that it is not necessary to provide stocks of different devices each capable of being subjected to only one of the above treatments.

It is therefore an object of the present invention to provide an improved getter device and an improved process for the manufacture of an exothermic getter device which is substantially free from one or more of the disadvantages of the prior art.

Another object is to provide an exothermic getter device which does not deteriorate on exposure to water or water vapor.

Yet another object is to provide an exothermic getter device which does not deteriorate on exposure to high temperatures in air.

A still further object is to provide an exothermic getter device which does not substantially alter the residual gas atmosphere within an electric discharge tube after evaporation of the getter metal.

Additional objects and advantages of the present invention will be apparent to those skilled in the art by reference to the following detailed description and drawings wherein.

Figure 1:
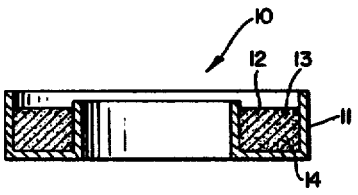
FIG. 1 is a cross-section of a getter device according to the present invention.

According to the present invention there is provided a method of manufacturing an air-bakeable, waterproof, exothermic getter device, and an electric discharge tube manufactured by using such a getter device. The method of the present invention comprises the steps of manufacturing a getter device by pressing a pulverulent mixture comprising a barium alloy and preferably a barium-aluminum alloy together with a metal capable of reacting exothermically with the barium-aluminum alloy into a holder, then the pulverulent mixture in the holder is exposed to an organosilane. In the broadest sense of the present invention any method of contacting the getter device with the organosilane is suitable. For instance in one preferred method the getter device may be dipped into a bath of the organosilane present as a pure liquid or in mixture with a suitable solvent. Another preferred method is to place the getter device in a vessel together with an amount of the organosilane. The vessel is evacuated and sealed. The organosilane is then heated to raise its vapor pressure so that its vapor molecules may contact the surface of the getter device.

The getter device is generally held at a temperature higher than that of the bath of the organosilane so that no liquid condensation may take place on the devices.

Furthermore, the temperature of the getter devices should be such that a molecular layer of a cross-linked organosilane coating forms on the surface of the getter device. The formation of such layers has been described in U.S. Pat. No. 3,901,761, however, this patent gives no indication that such a monomolecular layer provided on an exothermic getter device would be capable of preventing explosive evaporation of barium after water exposure or water vapor exposure or a high temperature air exposure.

Preferably the temperature of the getter device should be kept higher than about 100° C. in order that the organosilane may form a cross-linked monomolecular layer chemically bonded to the surfaces of the getter device. The highest temperature at which the getter device should be maintained is that temperature at which barium commences to evaporate, which is about 700° C. to 750° C. However, it is convenient to maintain the getter device at a temperature below the flash point of the particular organosilane being used. This ensures that no explosive reaction takes place between organosilane vapors and atmospheric oxygen in case of accidental breakage of or leaks in the evacuated vessel.

In addition to the barium alloy and the exothermic co-reactant the getter device can further comprise gas releasing materials such as $Fe_4N$ or $TiH_2$ as well as thermic moderators such as tungsten.

In accordance with the broadest aspects of the present invention any organosilane can be employed which imparts the herein described properties to the getter devices. Examples of suitable classes of organosilanes include, among others, monomeric siloxanes, polysiloxanes, aliphatic silanes and aromatic silanes and the substitution products thereof.

Figure 4:
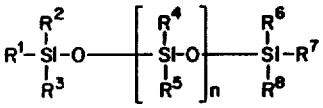
FIG. 4 is Formula I.
Figure 5:
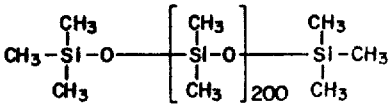
FIG. 5 is Formula II.
Figure 6:
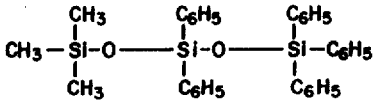
FIG. 6 is Formula III.

A preferred class of polysiloxanes are those of Formula I shown in FIG. 4 wherein $R^1$, $R^2$, $R^3$, $R^6$, $R^7$ and $R^8$ are independently selected from the group consisting of alkyl, aryl, aralkyl, alkaryl and hydrogen, with the proviso that at least one is selected from the group consisting of alkyl, aryl, aralkyl and alkaryl; wherein $R^4$ and $R^5$ are independently selected from the group consisting of alkyl, aryl, aralkyl and alkaryl; wherein "n" is generally an integer from zero to twenty thousand inclusive and is preferably an integer from zero to one thousand inclusive. Preferred species of polysiloxanes of Formula I are shown in Formulas II and III in FIGS. 5 and 6 respectively.

Examples of suitable alkyl radicals include, among others, methyl, ethyl, propyl, t-butyl, dodecyl, and allyl. Examples of suitable aryl radicals include, among others, phenyl and naphthyl. Examples of suitable aralkyl radicals include, among others, benzyl and 2-phenylpropyl. Examples of suitable alkaryl radicals include among others 3-methyl-phenyl and 4-butylnapthyl. Any of the above can be substituted by one or more non-interfering radicals such as halogens, such as chlorine or bromine. However, there is a widely held belief in the electronic industry that halogens have a damaging effect on the cathode activity of electronic discharge tubes. For this reason it is preferred to use non-halogenated organosilanes.

Referring now to the drawings and in particular to FIG. 1, there is shown an exothermic getter device 10 of the present invention. Exothermic getter device 10 comprises a stainless steel holder 11 in the form of an annular ring having a U-shaped channel cross section. Within the holder 11 is a pulverulent barium-aluminum alloy 12 mixed with pulverulent nickel 13. A cross-linked organosilane coating 14 is thermally bonded to the surface of the powders 12, 13.

Figure 2:
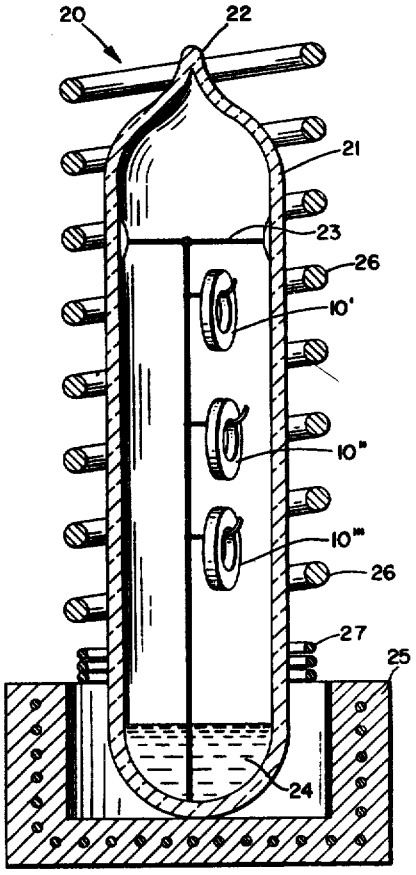
FIG. 2 is a diagrammatic cross-section of an apparatus for performing the process of the present invention.

FIG. 2 shows schematically, an apparatus 20 suitable for performing the preferred process of the present invention. Apparatus 20 comprises a glass vessel 21 evacuated and sealed at one end 22 by normal glass blowing techniques. Within vessel 21 is a wired support structure 23 supporting a number of exothermic getter devices 10', 10'', 10'''. Furthermore the glass vessel 21 contains a non-halogenated organosilane fluid 24.

Surrounding the portion of vessel 21, which contains the organosilane fluid 24, is placed in a first heating device 26. A second heating device 26 in the form of a spiral coil of resistance wire is placed around vessel 21 to heat the exothermic getter devices 10', 10'', 10'''. A cooling coil 27 is placed around vessel 21 in a zone between the first and second heating devices to ensure that condensation as a liquid of the organosilane vapor takes place preferentially in this zone rather than on the exothermic getter devices 10', 10'', 10'''.

In operation the getter devices 10', 10'', 10''' are heated to about 200° C. by means of coil 26. The organosilane fluid is heated to about 200° C. by means of the heating device 25. Cooling coil 27 maintains the zone between the two heating devices at about 180° C. The getter devices are maintained at 200° C. for 1 hour after which the apparatus is allowed to cool to room temperature and the getter devices are removed from the vessel. They are now ready to be used in the fabrication of electric discharge tubes such as a color display tube.

Figure 3:
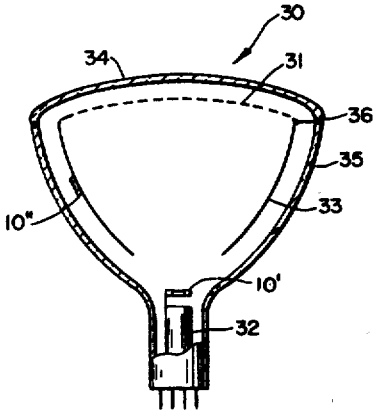
FIG. 3 is a diagrammatic partial cross-section of a color display tube having two exothermic getter devices of the present invention.

FIG. 3 shows a partial cross-section of a color display tube 30 comprising a shadow mask 31, an electron gun assembly 32 and an iron screening element 33. A first exothermic getter device 10' treated according to the above organosilane process is assembled onto the electron gun. The getter device and electron gun are previously washed in tepid water, which may also contain a small amount of surface active agent. A second getter device 10'', again treated according to the above process, is attached to the iron screen 33. The second getter device 10'' does not have to be washed but it may remain exposed to the atmosphere and hence humidity for relatively long times before final tube assembly. Furthermore, the second getter device 10'' is already attached to iron screen 33 during sealing of the face plate 34 to the cone 35 by means of the hermetic seal 36. This sealing process takes place at 400° C. or more and lasts for 1 hour.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

Six identical exothermic getter devices were manufactured each comprising a stainless steel holder in the form of a ring of 18 mm outside diameter having a U-shaped channel cross-section. In each channel were placed 320 mg of a pulverulent mixture, of approximately 50% by weight of an alloy of 50% by weight barium and aluminum, with 50% by weight of nickel. Three of the getter devices were placed on a wire support within a glass vessel. Approximately 10 cc of tri-methyl penta-phenyl tri-siloxane was also placed in the glass vessel, out of direct contact with the getter devices. The glass vessel was evacuated by a rotary pump and then sealed. The sealed vessel was then placed in an oven at 200° C. for 1 hours. After removal from the oven the vessel and its contents were allowed to cool to room temperature and the treated getter devices were removed.

All six getter devices were then heated in air at 420° C. for 1 hour to simulate the color display tube face plate to cone sealing process.

The six getter devices were each placed in separate glass vessels, which were then evacuated by a rotary and a diffusion pump. Each getter device was then caused to evaporate barium by subjecting them to induction heating. The three getter devices which had not been treated with the organosilane fluid exhibited an explosive evaporation of barium with particles of barium and the getter alloy mixture being violently ejected from the stainless steel holder. The three getter devices treated with organosilane fluid showed a controlled evaporation of barium vapor with no signs of explosive reaction.

EXAMPLE 2

A further six getter devices were prepared as in Example 1, three of which were treated with tri-methyl pentaphenyl tri-siloxane exactly as described in Example 1. The getter devices were then immersed in warm tap water. After about 20 seconds, the untreated getter devices started to evolve bubbles of gas, thus showing attack of the getter metal vapor releasing material by the water. Even after 1 minute the treated getter devices showed no signs of attack as no gas bubbles were evolved.

EXAMPLE 3

Getter devices were prepared as described in Example 1. The getter devices were immersed in di-methyl polysiloxane oil (AK 0.65 manufactured by Wacker-Chemie GmbH, Monaco, Germany) by immersion in the oil for 15 minutes. The impregnated getter devices were then air-dried.

The getter devices were then heated in air at 420° C. for 1 hour and "flashed" in a vacuum as described in Example 1.

The getter devices treated with di-methyl polysiloxane fluid showed a controlled evaporation of barium vapor with no signs of explosive reaction.

EXAMPLE 4

Getter devices were prepared as in Example 3. After being air-dried, the getter devices were treated thermally in dynamic vacuum at 300° C. for 60 minutes. Then the getter devices were heated in air at 420° for 1 hour and "flashed" in a vacuum as described in Example 3. The results were similar to those of Example 3.

EXAMPLE 5

Getter devices were prepared as in Example 3. After being air-dried the getter devices were placed in warm water (about 60° C.) and the time from immersion to copious bubble formation was observed visually. Bubbles formed rapidly on the getter devices.

EXAMPLE 6

Getter devices were prepared as in Example 4. After the thermal treatment in dynamic vacuum at 300° C. for 60 minutes the getter devices were washed with warm water as in Example 5. Bubbles formed on the getter devices after 2½ minutes.

EXAMPLES 7-10

Examples 3-6 were repeated using 10% by volume of the dimethyl-polysiloxane oil with 90% by volume of xylene to impregnate the getters. Results were similar to those using 100% oil.

EXAMPLES 11-14

Examples 7-10 were repeated using a dimethyl polysiloxane oil with a chain length having approximately 200 silicon-oxygen groups per molecule. This oil of longer chain length proved preferable to the one used for Examples 7-10, as the getter devices showed greater resistance in the "$H_2O$ test".

EXAMPLES 15-18

Examples 7-10 were repeated using a dimethylpolysiloxane oil with a chain length having approximately 1400 silicon-oxygen groups per molecule. The results were similar to those found in Examples 11-14 except for a failure (rapid bubble formation) in Example 17.

EXAMPLES 19-22

Examples 11-14 were repeated using a methyl phenyl polysiloxane oil with a chain length of approximately 108 silicon-oxygen groups per molecule and approximately a 12% phenyl substitution in the chain. The results were similar to those obtained in Examples 11-14, though with better results in Example 21 compared with the similar Example 13.

EXAMPLES 23-24

Examples 1 and 2 were repeated but using the same methyl phenyl polysiloxane used in Examples 19-22. The results were similar to those of Examples 1 and 2.

EXAMPLES 25-28

These examples were carried out using methyl dichlorosilane (No. 5899 manufactured by Merck and Co., Inc., New Jersey, U.S.A.). The getter devices were exposed to the methyl dichlorosilane vapor in air for 60 seconds and then tested similarly to Examples 7-10. The results of the tests were all satisfactory.

EXAMPLES 29–32

Examples 25–28 were repeated using dichlorochlormethyl methyl silane (No. 804/86 Merck and Co., Inc., N.J., U.S.A.). The getter devices formed bubbles rapidly during the immersion in water test, but performed successfully in the "Frit" test.

EXAMPLE 33

This comparative example records the behavior of additional prior-art, untreated control getters as in Example 1.

EXAMPLE 34

This records the behavior of untreated control getters used in each of the water washing tests described in the foregoing examples.

The above examples are summarized in Table 1 below, with its appended explanatory footnotes.

following the symbols AK and AS identifies the viscosity of the oil in centistokes In the table "bulb" identifies the method of impregnating the getter devices using the pure oil in an evacuated glass vessel.

In the table "bath" identifies the method of impregnating the getter devices by immersing them in the oil or oil-solvent mixture for 15 minutes.

In the table "% oil" gives volume % oil to xylene composition of the bath.

In the table "bake" refers to the thermal treatment in dynamic vacuum at 300° C. for 60 minutes after air-dry.

In the table in the "$H_2O$ test" getter devices are placed in warm water (approx. 60° C.) and the time until bubble formation is observed visually.

The "Frit test" referred to in the table is an air heat treatment for 1 hour at 420° C. and subsequent "flash" in vacuum. "Explosion" is observed by visual observation of vigorous ejection of glowing particles from the

| | | TESTS PERFORMED | | | | | | | |
|---|---|---|---|---|---|---|---|---|---|
| "n" | OIL | BULB | BATH | % OIL | BAKE | $H_2O$ TEST | FRIT TEST | COMMENTS | EXAMPLE NO. |
| 1 | DC 705 | X | | | | | X | OK-no explosion | 1 |
| 1 | DC 705 | X | | | | X | | OK-resists more than 5 min. | 2 |
| 0 | AK 0.65 | | X | 100 | | | X | OK-no explosion | 3 |
| 0 | AK 0.65 | | X | 100 | X | | X | OK-no explosion | 4 |
| 0 | AK 0.65 | | X | 100 | | X | | fail | 5 |
| 0 | AK 0.65 | | X | 100 | X | X | | resists 2½ min. | 6 |
| 0 | AK 0.65 | | X | 10 | | | X | OK-no explosion | 7 |
| 0 | AK 0.65 | | X | 10 | X | | X | OK-no explosion | 8 |
| 0 | AK 0.65 | | X | 10 | | X | | fail | 9 |
| 0 | AK 0.65 | | X | 10 | X | X | | resists 2½ min. | 10 |
| 200 | AK 350 | | X | 10 | | | X | OK-no explosion | 11 |
| 200 | AK 350 | | X | 10 | X | | X | OK-no explosion | 12 |
| 200 | AK 350 | | X | 10 | | X | | resists 3 min. | 13 |
| 200 | AK 350 | | X | 10 | X | X | | OK-resists more than 5 min. | 14 |
| 1400 | AK 100,000 | | X | 10 | | | X | OK-no explosion | 15 |
| 1400 | AK 100,000 | | X | 10 | X | | X | OK-no explosion | 16 |
| 1400 | AK 100,000 | | X | 10 | | X | | fail | 17 |
| 1400 | AK 100,000 | | X | 10 | X | X | | OK-resists more than 5 min. | 18 |
| 108? | AS 200 | | X | 10 | | | X | OK-no explosion | 19 |
| 108? | AS 200 | | X | 10 | X | | X | OK-no explosion | 20 |
| 108? | AS 200 | | X | 10 | | X | | OK-resists more than 5 min. | 21 |
| 108? | AS 200 | | X | 10 | X | X | | OK-resists more than 5 min. | 22 |
| 108? | AS 200 | X | | | | | X | OK-no explosion | 23 |
| 108? | AS 200 | X | | | | X | | OK-resists more than 5 min. | 24 |
| | 5899 | Vapour in Air | | | | | X | OK-no explosion | 25 |
| | 5899 | " | | | X | | X | OK-no explosion | 26 |
| | 5899 | " | | | | X | | OK-resists more than 5 min. | 27 |
| | 5899 | " | | | X | X | | OK-resists more than 5 min. | 28 |
| | 804/86 | " | | | | X | | OK-no explosion | 29 |
| | 804/86 | " | | | X | | X | OK-no explosion | 30 |
| | 804/86 | " | | | | X | | fail | 31 |
| | 804/86 | " | | | X | X | | fail | 32 |
| | | | | | | | X | fail-explodes | 33 |
| | | | | | | X | | fail-resists only 20 sec. | 34 |

In the table "n" is the approximate number of silicon-oxygen groups per molecule of polysiloxane as shown in Formula I.

In the table "oil" refers to polysiloxane and chlorsilane manufacturers' identification number. The number getter device.

From the results obtained in the examples as described above, it can be seen, by comparing Examples 3–6 with Examples 7–10, that use of a pure oil or an oil solvent mixture gives identical results.

Comparison of Examples 5, 9, 13, 17 show that without the thermal vacuum treatment ("bake") only oils of "n" about 108 give any substantial degree of water treatment protection. Comparison of Examples 6, 10, 14, 18 show that the "bake" treatment improved the water resistance considerably being satisfactory for "n" greater than zero. It can be seen from the results of Examples 19–22 that for methyl-phenyl oils the "bake" treatment may not be necessary.

Examples 3, 4, 7, 8, 11, 12, 15, 16 show that the oil-treated getter devices are "frittable" both with and without the "bake" treatment.

Comparison of Examples 19–22 with Examples 23–24 show no difference between the efficiency of "bulb" and "bath" treatments.

It can be seen from the results of Examples 25–28 compared with Examples 29–32 that the halogenated silanes are rather selective in giving water protection.

The oils used in Examples 19–22 had approximately 10% phenyl substitution while Examples 1–2 had 62.5% phenyl substitution. Comparison shows similar results with both amounts of phenyl in the chain and for both lengths of the chain of siloxane groups (108 for Examples 19–22, 3 for Examples 1–2).

Although the invention has been described in considerable detail with reference to certain preferred embodiments thereof, it will be understood that variations and modifications can be effected within the spirit and scope of the invention as described above and as defined in the appended claims.

What is claimed is:

1. A getter device comprising a barium alloy; a metal capable of reacting exothermically admixed with the barium alloy and having an organosilane coating.

2. A getter device of claim 1 wherein the organosilane is a polysiloxane.

3. A getter device of claim 2 wherein the polysiloxane is one of Formula I

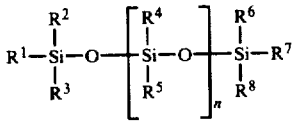

wherein $R^1$, $R^2$, $R^3$, $R^6$, $R^7$, and $R^8$ are independently selected from the group consisting of alkyl, aryl, aralkyl, alkaryl and hydrogen with the proviso that at least one is selected from the group consisting of alkyl, aryl, aralkyl, and alkaryl;

wherein $R^4$, and $R^5$ are independently selected from the group consisting of alkyl, aryl, aralkyl and alkaryl;

wherein "n" is an integer from zero to 20,000 inclusive.

4. A getter device of claim 1 wherein the organosilane is an aliphatic or aromatic silane.

5. A getter device of claim 1 wherein the barium alloy is a barium-aluminum alloy.

6. A getter device of claim 5 wherein the barium-aluminum alloy is $BaAl_4$.

7. A getter device of claim 1 wherein the metal capable of reacting exothermically is selected from the group consisting of Ni, Ti, Fe, Mo and alloys thereof.

8. A getter device of claim 1 wherein the metal capable of reacting exothermically is Ni.

9. A getter device of claim 1 comprising:

A. an annular ring;

B. a pulverulent intimate mixture of a barium-aluminium alloy and nickel held by the ring;

C. an organosilane coating covering the entire getter device wherein said coating is an organosilane of Formula II

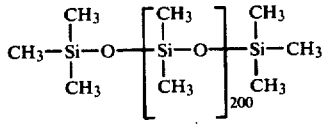

10. A getter device of claim 1 comprising:

A. an annular ring;

B. a pulverulent intimate mixture of a barium-aluminium alloy and nickel held by the ring;

C. an organosilane coating covering the entire getter device wherein said coating is an organosilane of Formula III

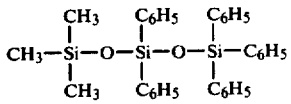

11. A getter device comprising a barium alloy, a metal capable of reacting exothermically admixed with the barium alloy and having an organosilane coating, wherein the weight ratio of the barium alloy to the metal capable of reacting exothermically is 1:4 to 4:1.

12. A method of manufacturing an exothermic getter device comprising the steps of pressing a pulverulent mixture comprising a barium-aluminum alloy together with a metal capable of reacting exothermically with the barium-aluminum alloy into a holder, then exposing the pulverulent mixture in the holder to an organosilane, thereby producing a coating.

13. A method according to claim 12 in which the organosilane contains aliphatic and/or aromatic radicals.

14. A method according to claim 12 in which the organosilane is poly di-methyl siloxane.

15. A method according to claim 12 in which th e organosilane contains phenyl radicals.

16. A method according to claim 15 in which the organosilane is selected from the group consisting of:

(a) Tetra-methyl tetra-phenyl tri-siloxane (b) Tri-methyl penta-phenyl tri-siloxane.

17. A method according to claim 12 in which the organosilane contains both phenyl and methyl radicals.

18. A method according to claim 12 in which the organosilane is in the vapor phase.

19. A method according to claim 12 in which the organosilane is in the liquid phase.

* * * * *